June 17, 1924.

C. BOUIN

VIEWING APPARATUS

Filed May 25, 1923

INVENTOR:
Charles Bouin
by Mawhinney & Mawhinney
Attorneys

June 17, 1924.

C. BOUIN 1,498,434

VIEWING APPARATUS

Filed May 25, 1923   2 Sheets-Sheet 2

Fig. 3.

INVENTOR:
Charles Bouin
by Mawhinney & Mawhinney
Attorneys

Patented June 17, 1924.

1,498,434

UNITED STATES PATENT OFFICE.

CHARLES BOUIN, OF BOSTON, MASSACHUSETTS.

VIEWING APPARATUS.

Application filed May 25, 1923. Serial No. 641,365.

*To all whom it may concern:*

Be it known that CHARLES BOUIN, a citizen of the United States, residing at Boston, in the county of Suffolk and State of Massachusetts, has invented certain new and useful Improvements in Viewing Apparatus, of which the following is a specification.

The present invention relates to improvements in viewing apparatus in which successive pictures upon a continuous film strip are adapted to be viewed singly causing the pictures to register in sequence with the apertures in a film gate located midway between a pair of eye pieces having prismatic lenses so designed and so cooperating with the film gate as to focus both eyes of the beholder upon the single picture presented at said gate.

It is an object of the invention to provide an apparatus for accomplishing the above-described purposes simply and faithfully with a construction contained within relatively small compass, in which adjustability is provided for the eye-pieces with respect to the film gate and wherein a Geneva movement cooperates with the film strip to advance the same intermittently.

It is a further object of the invention to provide for the smooth and taut conditions of the film by the use of an appropriate pressure device whereby the film will be in a presentable condition well suited to pleasing vision.

The invention further aims to provide the apparatus upon a stand capable of vertical adjustment and angular movement.

With the foregoing and other objects in view, the invention will be more fully described hereinafter, and will be more particularly pointed out in the claim appended hereto.

In the drawings, wherein like symbols refer to like or corresponding parts throughout the several views, Figure 1 is a top plan view, with parts in section, showing an improved viewing apparatus constructed according to the present invention.

Figure 3 is a side view of the same with the film removed.

Figure 1:
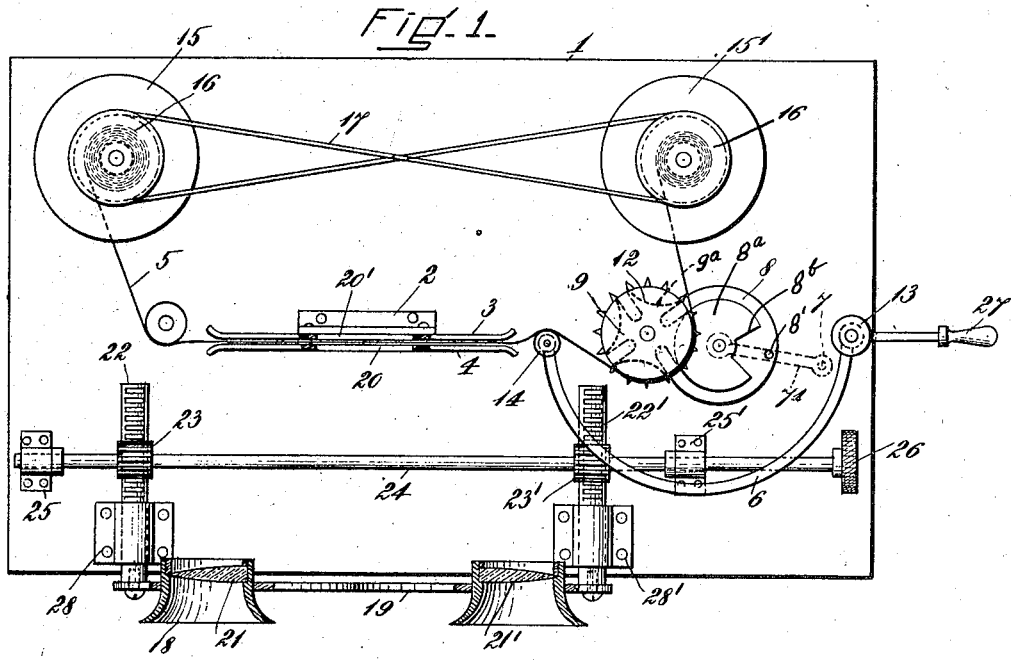
Figure 2:
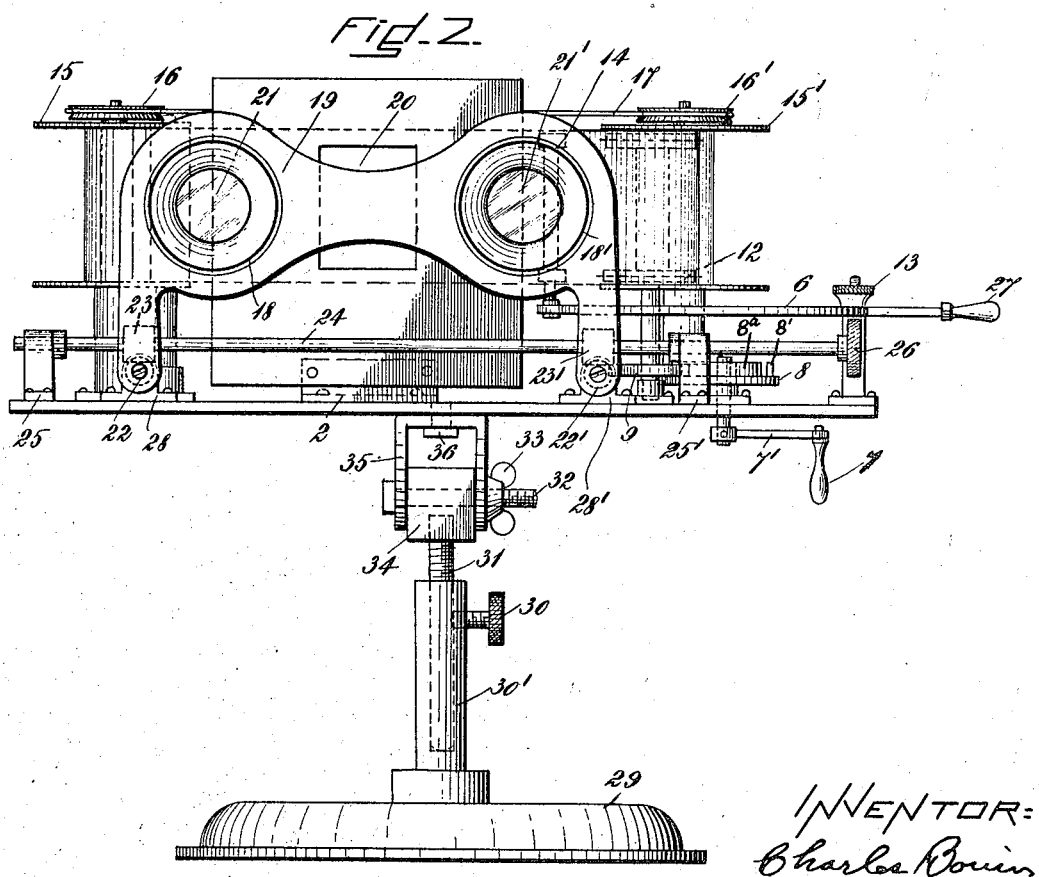
Figure 2 is a front elevation of the apparatus.

Referring more particularly to the drawings, 1 designates a bed plate upon which is substantially centrally supported the film gate composed of the members 3 and 4 spaced apart to receive the film 5 therebetween and secured as by the bracket 2 to said bed plate.

The film gate is provided with apertures 20 and 20' with which the pictures upon the strip 5 are adapted to successively register as the film is drawn intermittently through the film gate. The apertures 20 and 20' are substantially centrally of the film gate while the eye pieces 18 and 18', hereinafter referred to, are located to opposite sides of the central portion of the film gate, the eye pieces having lenses 21 and 21' therein of a wedge shape in horizontal section, the thin points of the wedges being disposed outermost. The eyes will be thereby focused upon the central pictures.

The film is wound initially upon a spool or drum 15 carried at one side of the bed plate 1 and after passing through the film gate is re-wound upon a companion spool or drum 15' carried at the other side of said bed plate. During the course of its movement, the film 5, which is provided with the usual marginal perforations, is engaged by the sprocket wheels 12 turned by a Geneva gear 9 coupled thereto and being in substantially the form of a Maltese cross as clearly appears in Figure 1.

The film sprocket is also carried by the bed plate 1 preferably forwardly of the re-wind spool 15' so that this sprocket draws the film from the film spool 15 and circulates it to the companion spool 15', said last mentioned spool receiving movement from the spool 15 by means of a crossed belt 17 engaged with pulleys 16 and 16' upon the upper ends of the spools 15 and 15'.

The Geneva gear 9 is adapted to be engaged periodically by a pin 8' projecting upwardly from the upper face of a continuously rotating drive disc 8 supported from the base plate and receiving movement from an appropriate source as by hand manipulation from the handle 7 having the extension arm or crank 7'. The disc 8 is also provided with a drum portion $8^a$ upon the upper face thereof adapted to engage the arcuate or curved outer faces $9^a$ of the arms of the cross upon the Geneva gear 9, this for the purpose of avoiding any retrograde rotation of the sprocket when the pin 8' is out of engagement with the slots between the arms in the Geneva gear. The drum 8ᵃ is provided with a gap or slot 8ᵇ to receive successively the arms of the Geneva gear following the slotted portion engaged by the pin 8'. Of course the handle 7 may be turned in either direction and it is not important whether the spool 15 is the supply or the receiving spool as the apparatus will work equally well without regard to the direction of movement of the film 5.

The fact that the Geneva gear is prevented from movement during the interval that the drive pin is disengaged therefrom, will tend to prevent any looseness occurring in the film, but should slack occur I intend to remedy this situation by the use of a tension roller 14 carried upon the free end of the curved arm 6 which is pivoted upon the bed plate 1 and is urged against the film by the pressure applied to the handle 27 which for this purpose extends beyond the edge of the bed plate. The arm 6 is curved to extend about the driving device and the set nut 13 is used to hold the tension device in the adjusted position.

The film is intended to be viewed through eye pieces 18 and 18' suitable for the left and right eyes and being carried by a frame 19 supported upon the outer ends of a pair of rack bars 22 and 22' with which are adapted to mesh the pinions 23 and 23' upon a shaft 24. The shaft 24 is journaled in bearings 25 and 25' carried upon the forward portion of the bed plate 1 and the shaft lies substantially parallel with the forward edge of said plate. A knurled or milled head 26 is carried at one end of the shaft for the purpose of its convenient rotation to adjust the eye pieces.

The bed plate 1 is adapted to be supported upon a stand composed of a base 29 having a hollow post 30' erected centrally thereon and slidably receiving a shaft 31 which may be screw threaded therein so as to be vertically adjustable on rotation. A set screw 30 is used to hold the shaft 31 against casual movement. Upon the upper end of the shaft 31 is a head or block 34 received between the depending flanges of a bracket 35 secured to the bottom of the bed plate 1 as by the rivets or other fastenings 36. The bracket is of substantially semicircular shape as shown in Figure 3 and a bolt 32 passes through the block and the flanges of the bracket to pivotally secure the same while the winged nut 33 threaded upon the bolt 32 is adapted to be tightened for the purpose of securing the parts after the adjustment has been effected.

In use the film, either of the opaque or translucent character, and carried upon a spool, is inserted in the machine and threaded through the film gate, being engaged with the sprocket 12 and with the re-wind spool. The movement of the drive apparatus is then begun by rotating the hand crank 7 and the beholder views the pictures presented at the gate opening through the eye pieces 18 and 18' which contain the prismatic lenses 21 and 21'. These prismatic lenses are of high magnification and are placed in the eye pieces with their thin edges outward, being just the reverse of the position of prismatic lenses in stereoscopes. Due to the Geneva movement, the pictures upon the film will be presented in sequence before the apertures in the film gate and these pictures will be retained in accurate registry with the apertures for a suitable interval of time sufficient for viewing the individual picture; and such pictures may be related and depict subsequent scenes in a drama. The effect produced will be much like the viewing of motion pictures.

The apparatus may be adjusted both as to height and as to a tilting position by the use of the construction of the stand and the eye pieces may also be adjusted toward and from the film so that such apparatus will be of use to all persons.

It is obvious that various changes and modifications may be made in the details of construction and design of the above specifically described embodiment of this invention without departing from the spirit thereof, such changes and modifications being restricted only by the scope of the following claim.

What is claimed is:—

A viewing apparatus comprising a bed plate, film spools thereon, a film gate for receiving the film from one spool, a Geneva motion for moving said film intermittently, pressure means for the film, and adjustable eye pieces, said film gate having a central opening and said eye pieces having lenses at opposite sides of the center of the central opening, said lenses being wedge-shaped in horizontal cross-section with the thin points of the wedge outermost.

In testimony whereof I affix my signature.

CHARLES BOUIN.